US009504084B2

(12) United States Patent
Niu et al.

(10) Patent No.: US 9,504,084 B2
(45) Date of Patent: Nov. 22, 2016

(54) METHOD TO SUPPORT AN ASYMMETRIC TIME-DIVISION DUPLEX (TDD) CONFIGURATION IN A HETEROGENEOUS NETWORK (HETNET)

(75) Inventors: Huaning Niu, Milpitas, CA (US); Jong-Kae Fwu, Sunnyvale, CA (US); Xiangying Yang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 273 days.

(21) Appl. No.: 13/994,108

(22) PCT Filed: Dec. 16, 2011

(86) PCT No.: PCT/US2011/065588
§ 371 (c)(1),
(2), (4) Date: Aug. 22, 2013

(87) PCT Pub. No.: WO2013/006197
PCT Pub. Date: Jan. 10, 2013

(65) Prior Publication Data
US 2013/0343241 A1   Dec. 26, 2013

Related U.S. Application Data

(60) Provisional application No. 61/504,054, filed on Jul. 1, 2011.

(51) Int. Cl.
*H04J 3/00* (2006.01)
*H04W 76/04* (2009.01)
(Continued)

(52) U.S. Cl.
CPC ......... *H04W 76/048* (2013.01); *H04B 7/0697* (2013.01); *H04B 15/00* (2013.01);
(Continued)

(58) Field of Classification Search
CPC .................................. H04W 52/244
See application file for complete search history.

(56) References Cited

U.S. PATENT DOCUMENTS 8,547,989 B2 * 10/2013 Dayal ................ H04W 88/10
370/437
8,705,419 B2 * 4/2014 Khandekar ............ H04B 7/155
370/310
(Continued)

FOREIGN PATENT DOCUMENTS

SE   WO 2012154094 A1 * 11/2012 .......... H04W 52/143
WO   2013/006197 A1   1/2013

OTHER PUBLICATIONS

International Preliminary Report on Patentability and Written Opinion for PCT Patent Application No. PCT/US2011/065588, mailed on Jan. 16, 2014, 6 pages.
(Continued)

*Primary Examiner* — Guang Li
(74) *Attorney, Agent, or Firm* — Thorpe North & Western LLP

(57) ABSTRACT

A method to support an asymmetric time-division duplex (TDD) configuration at a macro node in a heterogeneous network (HetNet) is disclosed. The method at the macro node comprises transmitting a half blank subframe (HBS) of a downlink subframe during an uplink subframe of a low power node in the HetNet. An effective transmission range of the macro node can overlap with an effective transmission range of the low power node. The downlink subframe and the uplink subframe can occur on a substantially same carrier frequency. The HBS can have a reduced transmission power during an uplink control channel or a random access channel of the uplink subframe of a mobile device transmission to the low power node.

28 Claims, 9 Drawing Sheets

(51) Int. Cl.

| | |
|---|---|
| *H04W 72/12* | (2009.01) |
| *H04W 72/08* | (2009.01) |
| *H04W 88/06* | (2009.01) |
| *H04B 7/06* | (2006.01) |
| *H04L 1/06* | (2006.01) |
| *H04W 72/04* | (2009.01) |
| *H04B 15/00* | (2006.01) |
| *H04W 8/02* | (2009.01) |
| *H04W 24/00* | (2009.01) |
| *H04W 52/24* | (2009.01) |
| *H04W 52/02* | (2009.01) |
| *H04L 5/00* | (2006.01) |
| *H04L 27/34* | (2006.01) |
| *H04L 5/14* | (2006.01) |
| *H04W 4/00* | (2009.01) |
| *H04W 72/02* | (2009.01) |
| *H04W 76/02* | (2009.01) |
| *H04W 52/14* | (2009.01) |
| *H04W 24/08* | (2009.01) |
| *H04L 27/36* | (2006.01) |
| *H04L 1/00* | (2006.01) |
| *H04W 52/32* | (2009.01) |
| *H04W 84/04* | (2009.01) |

(52) U.S. Cl.
CPC ........... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1215* (2013.01); *H04W 72/1278* (2013.01); *H04W 76/028* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(56) References Cited

U.S. PATENT DOCUMENTS

| | | | | |
|---|---|---|---|---|
| 8,824,968 B2* | 9/2014 | Kim | ................... | H04L 5/0091 370/329 |
| 9,374,811 B2* | 6/2016 | Kim | ................... | H04L 1/1822 |
| 2004/0165601 A1* | 8/2004 | Liu | ................... | H04L 45/00 370/401 |
| 2005/0058151 A1* | 3/2005 | Yeh | ................... | H04W 52/46 370/445 |
| 2009/0046605 A1* | 2/2009 | Gao | ................... | H04W 72/14 370/280 |
| 2009/0264077 A1* | 10/2009 | Damnjanovic | ..... | H04W 52/244 455/63.1 |
| 2010/0323745 A1 | 12/2010 | Wanshi et al. | | |
| 2011/0170496 A1* | 7/2011 | Fong | ................... | H04L 5/0053 370/329 |
| 2011/0310830 A1* | 12/2011 | Wu | ................... | H04W 72/1289 370/329 |
| 2012/0003981 A1* | 1/2012 | Krishnamurthy | ..... | H04W 24/10 455/450 |
| 2012/0147826 A1* | 6/2012 | Teck | ................... | H04W 52/244 370/329 |
| 2013/0044678 A1* | 2/2013 | Qu | ................... | H04W 52/244 370/328 |
| 2013/0121191 A1* | 5/2013 | Song | ................... | H04J 11/0056 370/252 |
| 2013/0322235 A1* | 12/2013 | Khoryaev | ............. | H04W 24/10 370/229 |
| 2014/0086203 A1* | 3/2014 | Furuskar | ............. | H04W 52/143 370/330 |
| 2014/0126530 A1* | 5/2014 | Siomina | ............. | H04W 52/146 370/330 |

OTHER PUBLICATIONS

3GPP TS 36.211, "Evolved Universal Terrestrial Radio Access (E-UTRA); Physical Channels and Modulation (Release 9)", V9.1.0, Mar. 2010, pp. 1-85.

3GPP TS 36.212, "Evolved Universal Terrestrial Radio Access (E-UTRA); Multiplexing and channel coding (Release 8)", V8.1.0 Nov. 2007, pp. 1-39.

3GPP TR 36.213, "LTE; Evolved Universal Terrestrial Radio Access (E-UTRA); Physical layer procedures (Release 8)", V8.8.0, Oct., 2009, pp. 1-79.

3GPP TS 36.214, "LTE; Evolved Universal Terrestrial Radio Access (E-UTRA); Physical layer; Measurements (Release 10)", V10.1.0, Apr. 2011, pp. 1-15.

Texas Instruments,"Views on UL Interference in context of CA-Based HetNets", 3GPP TSG RAN WG1 Meeting #67, R1-114347, Nov. 14-18, 2011, pp. 1-5.

Potevio, "Possible air interface changes of the candidate solutions for ABS interference management", 3GPP TSG RAN WG1 Meeting # 67, R1-114132, Nov. 14-18, 2011, 2 Pages.

Ericsson, "On UL interference in Heterogeneous deployments", 3GPP TSG RAN WG1 Meeting # 67, R1-114295, Nov. 14-18, 2011, 3 pages.

Intel Corporation, "Discussion on HARQ feedback of TDD Inter-band Carrier Aggregation", 3GPP TSG RAN WG1 Meeting # 67, R1-113951, Nov. 14-18, 2011, pp. 1-6.

International Search Report and Written Opinion received for PCT application No. PCT/US2011/065588, mailed on Jul. 30, 2012, 9 pages ZTE, "Performance of Interference Management for TDD", 3GPP TSG-RAN WG1 R1-104565, Discussion/Decision, Aug. 2010, Meeting 62, Agenda 6.8.1, 10 pages, Madrid, Spain.

* cited by examiner

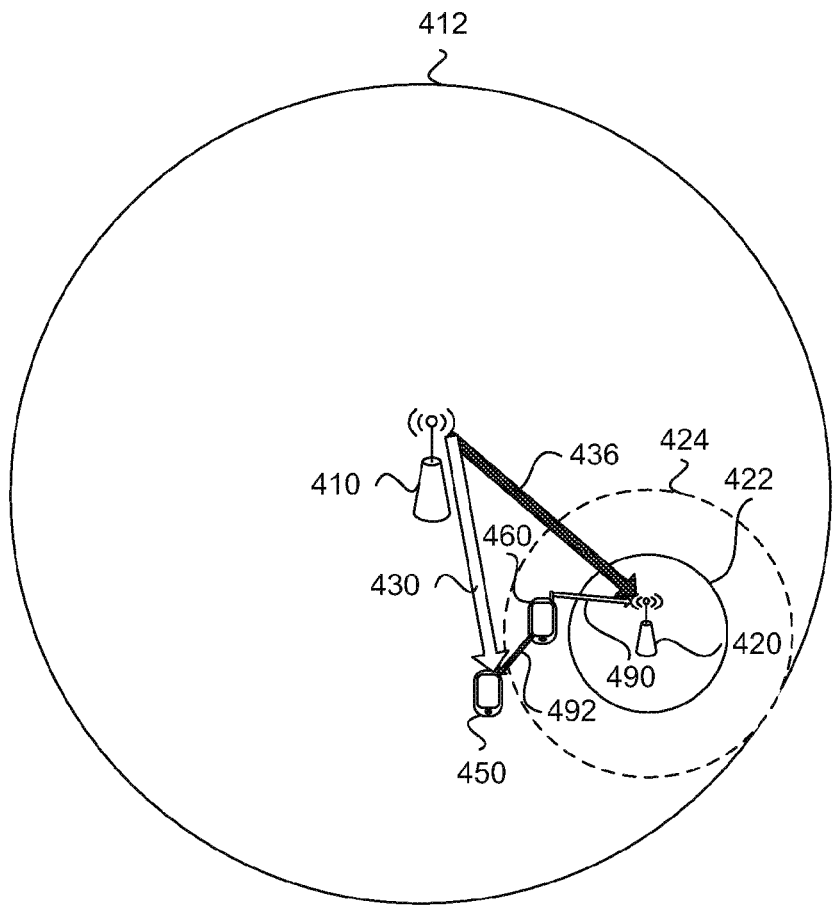
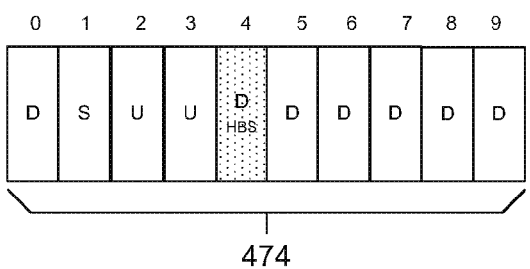
Configuration 4 for Macro Node
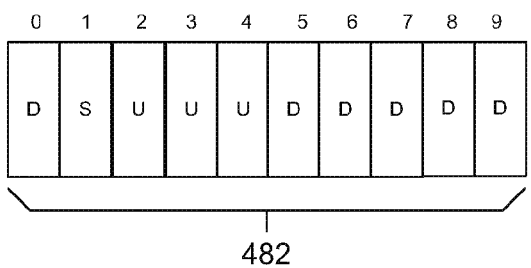
Configuration 3 for Low Power Node
FIG. 2

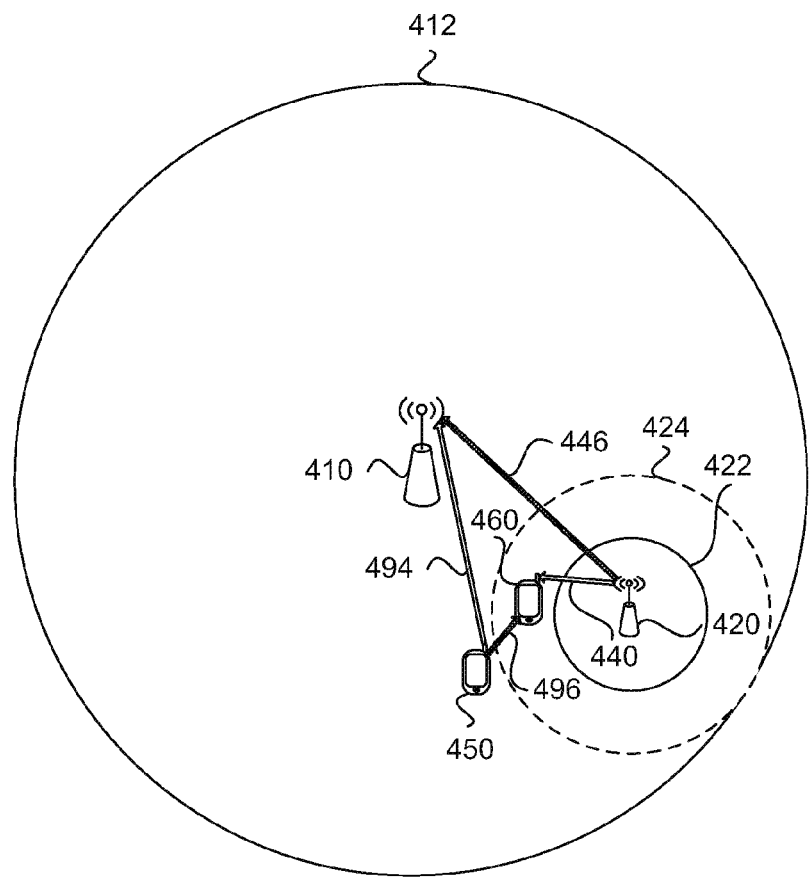
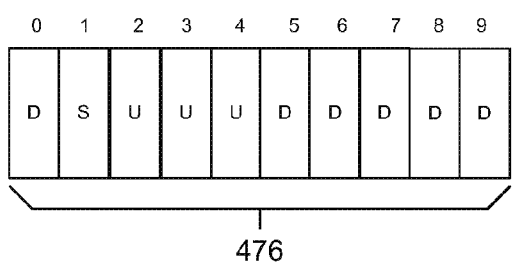
Configuration 3 for Macro Node
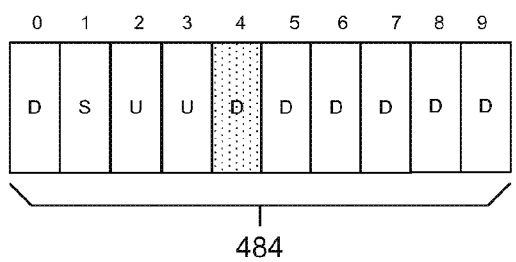
Configuration 4 for Low Power Node
FIG. 3

500 ⟶

> Transmitting a half blank subframe (HBS) of a downlink subframe by a macro node in the HetNet during an uplink subframe of a low power node in the HetNet, wherein an effective transmission range of the macro node overlaps with an effective transmission range of the low power node, and the downlink subframe and the uplink subframe occur on a substantially same carrier frequency; and
> wherein the HBS has a reduced transmission power during an uplink control channel or a random access channel of the uplink subframe of a mobile device transmission to the low power node. ⟵ 510

METHOD TO SUPPORT AN ASYMMETRIC TIME-DIVISION DUPLEX (TDD) CONFIGURATION IN A HETEROGENEOUS NETWORK (HETNET)

BACKGROUND

Wireless mobile communication technology uses various standards and protocols to transmit data between a transmission station and a wireless mobile device. Some wireless devices communicate using orthogonal frequency-division multiplexing (OFDM) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the transmission station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless mobile device, known as a user equipment (UE). A downlink (DL) transmission can be a communication from the transmission station (or eNodeB) to the wireless mobile device (or UE), and an uplink (UL) transmission can be a communication from the wireless mobile device to the transmission station.

In homogeneous networks, the transmission station, also called macro nodes, can provide basic wireless coverage to mobile devices in a cell. Heterogeneous networks (HetNets) were introduced to handle the increased traffic loads on the macro nodes due to increased usage and functionality of mobile devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the transmission stations (or nodes), such as macro nodes and low power nodes. In ICIC an interfering node (or an aggressor node) may give up use of some resources in order to enable control and data transmissions between a victim node or victim mobile device.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a block diagram of an asymmetric radio frame configuration of a low power node with an uplink subframe and a macro node with a half blank subframe (HBS) in a downlink subframe in accordance with an example;

FIG. 3 illustrates a block diagram of an asymmetric radio frame configuration of a low power node with a downlink subframe and a macro node with an uplink subframe in accordance with an example;

FIG. 6 depicts a flow chart of a method to support an asymmetric time-division duplex (TDD) configuration at a macro node in a heterogeneous network (HetNet) using a half blank subframe (HBS) in accordance with an example;

Figure 1:
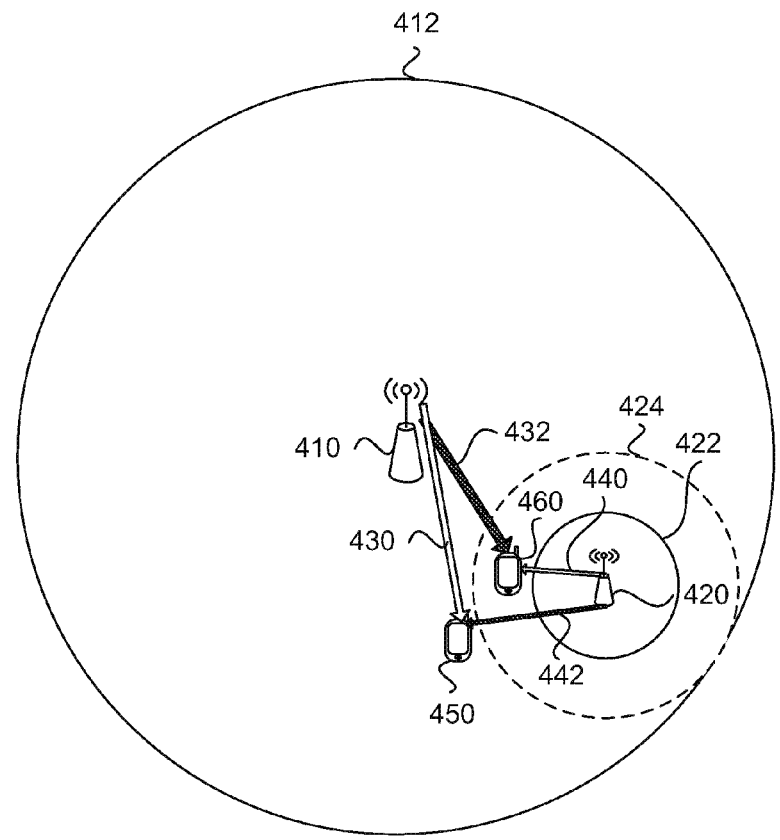
FIG. 1 illustrates a block diagram of a symmetric radio frame configuration of a low power node and a macro node with an almost blank subframe (ABS) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates a heterogeneous network (HetNet) with a high power macro node 410 (or macro-eNB) with a backhaul communication link (not shown) with a low power node 420 (micro-eNBs, pico-eNBs, femto-eNBs, home eNBs [HeNBs], remote radio head [RRH], or relay node). HetNets can be used to optimize performance particularly for unequal user or traffic distribution and improve spectral efficiency per unit area of a cell. HetNets can also achieve significantly improved overall capacity and cell-edge performance. Enhanced inter-cell interference coordination (eICIC) can be used to coordinate resources between the macro node and the low power node (LPN) in the HetNet and reduce interference.

Due the high signal power of the macro node relative to mobile devices, a transmission of a downlink subframe of a radio frame by the macro node can generate strong interference to an uplink subframe transmission by a mobile device to a LPN on a substantially same carrier frequency in a time-division duplex (TDD) configuration. The interference may hinder the LPN from demodulating and/or decoding the uplink subframe without significant errors. In order to mitigate the interference by the macro node, the macro node can transmit a half blank subframe (HBS) of the downlink subframe during various sections or intervals of the uplink subframe transmission by a mobile device to the LPN, so the LPN can properly receive information in the uplink subframe from the mobile devices associated with the LPN. Both the LPN and macro node can be in the HetNet. An effective transmission range of the macro node can overlaps with an effective transmission range of the LPN. In an example, a majority of an effective area of a low power cell serviced by the LPN may be within an effective area of a macro cell serviced by the macro node.

The HBS can have a reduced transmission power during an uplink control channel, such as a physical uplink control channel (PUCCH), or a random access channel, such as a physical random access channel (PRACH), of the uplink subframe of the LPN. In an example, the macro node may reduce transmission power of the HBS by at least a factor of ten using a transmission power backoff value. In another example, the macro node may reduce transmission power of the HBS transmitted to an approximately zero transmission power. The macro node may reduce transmission power of the HBS based on information received by the LPN. The information can be received via X2 signal through a backhaul communication link. In another example, the HBS can include reduced transmission power during a data section of the uplink subframe, along with the PUCCH and the PRACH.

Interference can be a combination of the power generated by an interference transmitter and distance of the interference transmitter to the receiver. Although mobile devices generally have a low transmission power relative to macro nodes and LPNs, a transmitting mobile device transmitting an uplink subframe in close proximity to a receiving mobile device receiving a downlink subframe on a substantially same carrier frequency in a TDD configuration can generate significant interference on the downlink subframe. For example, a macro node or a LPN can transmit a channel on the downlink subframe to a receiving mobile device at a same time the transmitting mobile device or interfering mobile device (in close proximity to the receiving mobile relative to the macro node or the LPN) is transmitting a channel on the uplink frame. The uplink subframe transmission can be an uplink interference and the transmitting mobile device generating the interference can be an nearby mobile device.

In an example, the receiving mobile device can measure the uplink interference from the transmitted uplink subframe of the nearby mobile device on the downlink subframe. The receiving mobile device can be receiving a channel on a downlink subframe from a serving node in the HetNet at substantially the same time the nearby mobile device transmits the uplink subframe to the nearby node in the HetNet. The nearby node can refer to the node associated with the nearby mobile device and not necessarily refer to a node nearby to the receiving mobile device. The downlink subframe and the uplink subframe can occur on a substantially same carrier frequency. In an example the serving node can include a LPN and the nearby node can include a macro node.

The uplink interference can be determined by a reference signal received power (RSRP), a reference signal received quality (RSRQ), a received signal strength indicator (RSSI), a channel quality indicator (CQI), and combinations of these interference measurements. The receiving mobile device can generate a mixed uplink-downlink measurement report from the measurement of the uplink interference. The receiving mobile device can send the mixed uplink-downlink measurement report to the serving node. The serving node may mitigate the interference by reschedule subsequent downlink subframes to another mobile device which is far away from the transmitting mobile device. The receiving mobile device may receive control information from the serving node rescheduling the downlink allocation to another downlink subframe which does not have the asymmetric interference. The serving node may also mitigate interference using other methods as well. In another example, the receiving mobile device may send the mixed uplink-downlink measurement report to the serving node when the uplink interference exceeds a predetermined interference level. The predetermined interference level may be determined by a measurement report trigger event, such as a LTE event A1-A5 (as described in 3GPP TS 36.331 V10.2.0 dated 2011-06). In another example the serving node can include a LPN and the nearby node can include a macro node.

The following provides additional details of the examples. Referring back to FIG. 1, a heterogeneous network (HetNet) can include a high power macro node 410 (or macro-eNB) with a backhaul communication link (not shown) with a lower power node 420 (micro-eNBs, pico-eNBs, femto-eNBs, home eNBs [HeNBs], remote radio head [RRH], or relay node). The backhaul communication link can be a wired, wireless, or optical fiber connection. The backhaul communication link may use X2 signaling. The HetNet (and homogeneous network) can include regular (planned) placement of macro nodes that can typically transmit at high power level, for example, approximately 5 watts (W) to 40 W, to cover the macro cell 412. The HetNet can be overlaid with low power nodes (LPNs), which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices. A LPN can be used in a microcell, a picocell, a femtocell, and/or home network. The microcell can be located in a mall, a hotel, or a transportation hub. The picocell can be located in small to medium size structures such as offices, shopping malls, train stations, stock exchanges, or in-aircraft. The femtocell can be located in small structures such as a home or a small business.

In an example, a microcell can have a range less than two kilometers (km) and a picocell can have a range within 200 meters (m). In another example, a femtocell can support up to 16 active mobile devices and can have a range within 50 m. In an example, a LPN may have a power less than 24 decibels relative to 1 milliwatt (dBm) for 1 antenna, less than 21 dBm for 2 antennas, and less than 18 dBm for 4 antennas. The decibel (dB) is a logarithmic unit that indicates the ratio of a physical quantity (usually power or intensity) relative to a specified or implied reference level. A ratio in decibels is ten times the logarithm to base 10 of the ratio of two power quantities. The power relative to 1 milliwatt (mW) can be represented by dBm (dB(mW)). In another example, a HeNB may have a power less than 20 dBm for 1 antenna, less than 17 dBm for 2 antennas, and less than 14 dBm for 4 antennas. The HeNB can perform many of the functions of the eNodeB, but the HeNB can be optimized or designed for use in a home or an office. A RRH may be used in a centralized, cooperative, or cloud radio access network (C-RAN), where the transmission station (or eNodeB) functionality can be subdivided between a base band unit (BBU) processing pool and a remote radio unit (RRU) or a remote radio head (RRH) with optical fiber connecting the BBU to the RRU. A relay node may be used to repeat the signaling of a macro node.

A same TDD configuration may be used by the macro node and the LPN in the HetNet. For example, the macro node can use a configuration 3 radio frame 472 and the LPN can use a configuration 3 radio frame 482 at substantially the same time. The configuration can determine the number and sequence of downlink subframes (denoted by "D"), uplink subframes (denoted by "U"), and special subframes (denoted by "S") in a radio frame. Time-division duplex (TDD) is an application of time-division multiplexing (TDM) to separate downlink and uplink signals. In TDD, downlink signals and uplink signals may be carried on the same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically taking turns on the channel. In frequency-division duplexing (FDD), a transmitter and a receiver to operate using different carrier frequencies. In FDD, interference is avoided because the downlink signal uses a different carrier frequency from the uplink signals. In LTE, a frame structure type 2 can be applicable to TDD, and a frame structure type 1 can be applicable to both full duplex and half duplex FDD.

A configuration can be referred to as a symmetric TDD configuration when the radio frame configurations (configuration 3 in FIG. 1) of the macro node 410 are the same as the LPN 420. In a symmetric TDD configuration, the subframe of each uplink transmission of the macro node can occur at substantially the same time as the subframe of each uplink transmission of the LPN. Similarly in the symmetric TDD configuration, the subframe of each downlink transmission of the macro node occurs at substantially the same time as the subframe of each downlink transmission of the LPN.

Generally, enhanced inter-cell interference coordination (eICIC) can allow interfering nodes to coordinate on transmission powers and/or spatial beams with each other in order to enable control and data transmissions to their corresponding mobile devices. For example, eICIC can provide interference mitigation for a symmetric TDD configuration. Illustrated in FIG. 1, a LPN 420 can have a standard cell range 422 (or inner cell range) or a cell range extension 424 (or cell range expansion, edge cell range, or cell-edge range). Due to the closer proximity of the mobile device to the LPN, the mobile device within the standard cell range of the LPN may experience less interference from the macro node and other sources than a mobile device within the cell range extension but outside the standard cell range. The standard cell coverage or range (or center cell range) can represent an area in space (a geographic area) near the transmitting station where the transmission power and signal can be strong and a co-channel interference can be minimal. A cell range extension can be area near to the boundary of the cell where the transmission power and signal is weaker than a signal in the standard cell and the co-channel interference can be more significant.

A mobile device 460 (also referred to as LPN mobile device, pico-UE [PUE], femto-UE [FUE], or home-UE [HEU]) in the cell range extension 424 can receive interference from a relatively strong downlink transmission 432 from the macro node 410 during a same subframe or same time as a downlink transmission 440 from the LPN 420. An almost blank subframe (ABS) can be used to mitigate the interference from a nearby node, such as a macro node. The ABS (subframe 5 and 6 as shown in radio frame 472 of FIG. 1) can be used by a mobile device 450 (also referred to as a macro mobile device or macro UE [MUE]) receiving a downlink transmission 430 from the macro node. The macro mobile device can a perform measurements on a LPN cell, such as on a downlink transmission 442, for possible load-balancing based handover or association. The LPN mobile device 460 at LPN cell edge can use the ABS to receive the LPN downlink control and/or downlink traffic, with less interference from the macro node. In another example, a mobile device 450 may not experience as much interference from a neighboring node, such as the LPN node, because the downlink transmission 430 from the serving node, such as the macro node, may have a stronger signal strength relative to an interfering downlink transmission 442 from the neighboring node.

In another example, a configuration can be referred to as an asymmetric TDD configuration when the radio frame configuration of the macro node 410 is different from the radio frame configuration of the LPN 420. The asymmetric TDD configuration can occur when neighboring cells, such as in a HetNet, use different TDD configuration. For example, FIG. 2 illustrates a macro node using a configuration 4 radio frame 474 and the LPN can using a configuration 3 radio frame 482 at the same time. In the example shown in FIG. 2, the macro node uses one extra downlink subframe compared to the LPN, as the macro node uses configuration 4 and the LPN uses configuration 3. In the example shown in FIG. 2, subframe 4 can be asymmetric. In an asymmetric TDD configuration, the subframe of an uplink transmission of the macro node can occur at substantially the same time as the subframe of a downlink transmission of the LPN. Similarly in the asymmetric TDD configuration, the subframe of a downlink transmission of the macro node can occur at substantially the same time as the subframe of an uplink transmission of the LPN. In other examples, the special subframe may be asymmetric with the uplink subframe or downlink subframe.

The downlink transmission by the macro node during the uplink subframe of a LPN or an uplink transmission by a nearby mobile device during the downlink subframe of a serving node, such as a LPN, can be referred to as an asymmetric TDD configuration. FIG. 2 illustrates an uplink-downlink configuration in subframe 4, where a downlink subframe of the macro node occurs at the same time as an uplink subframe of the LPN. Different uplink-downlink configuration in different cells of HetNet can exist for various reasons. For example, the mobile device associated with the LPN, such as a HeNB, may use more downlink centric applications such as video viewing and stream applications used in home environments. Thus, HeNB network may be configured to have more downlink subframes compared to a macro node. The additional node to node interference and mobile device to mobile device interference of the uplink-downlink configuration (or asymmetric TDD configuration) of the HetNet can be mitigated using the half blank subframe (HBS) by the macro node or the measurement of an uplink interference at the mobile device. The HBS can define a new node subframe type for uplink interference mitigation under different uplink-downlink configurations among cells. An uplink interference measurement at the mobile device can define a new measurement type for mixed uplink and downlink transmission in order to assist a node, such as a LPN, to make better scheduling to mitigate interference.

FIG. 2 illustrates node to node inference, where a macro node's downlink transmission 436 and 430 to mobile devices 450 in the macro cell interferes with a LPN's uplink reception of a mobile device's uplink transmissions 490 and 492 in the LPN cell. In an example, a desired downlink transmission 430 by the macro node may generate a corresponding interference 436, as in subframe 4. The interference of the macro node to the LPN may cause severe interference problem since the transmission power of macro node can be much higher than the uplink transmission of the mobile device (LPN mobile device) in the low power cell. Another interference can be a mobile device interference 492 from the mobile device 460 (LPN mobile device) in the low power cell to the mobile device 450 (macro mobile device) in the macro cell. The interference can occur when the LPN mobile device is very close to macro mobile device.

The macro node interference to the LPN can create severe performance degradation for an uplink transmission to the LPN, particularly a physical uplink control channel (PUCCH) and a physical random access channel (PRACH). A HBS can improve the PUCCH performance, particularly the PRACH performance. In the HBS, the downlink frequency resources at the macro node corresponding to the PUCCH and PRACH on the uplink subframe can be empty, have a reduced power, or blank out the interfering cell downlink resources (i.e., macro cell resources) corresponding to the PUCCH and PRACH of the interfered cell (or low power cell). The macro node may use a backhaul link connection to communication with nodes in the HetNet, such as the LPN. X2 signaling may be used between the macro node and LPN so LPN can inform the macro node about the uplink control and PRACH channel configuration of the interfered LPN. Additional information, such as a measured interference level, may be used by an aggressor macro node to determine transmission power backoff value for data and reference signal (RS) transmission. The downlink transmission during the PUCCH and PRACH of the LPN uplink subframe may have a power reduction less than downlink transmission of the data and RS transmission of the LPN uplink subframe, where the downlink transmission is reduced for the PUCCH, PRACH, data, and RS transmission of the LPN uplink subframe. The reference signals can be sounding reference signals (SRS) in an uplink subframe or cell-specific reference signals (CRS) in a downlink subframe. The SRS can be used by the LPN (eNodeB) to estimate the uplink channel conditions for each mobile device to decide the best uplink scheduling. The power reduction or "blanking" may apply to the CRS, which may impact the mobile devices in the macro cell. If the CRS transmission power is reduced, the mobile device may use an approach similar to the approach used on an ABS for signal processing. An advanced receiver type of signal processing may be used at the LPN to handle the CRS or a physical downlink control channel (PDCCH) interference in the HBS. The HBS may be used in a radio frame with the ABS. For example, a radio frame of a macro node may use a HBS in subframe 4 and a ABS in subframe 5.

In another example, a TDD-ABS may be used in asymmetric TDD configuration. The TDD-ABS of the macro node may reduce interference on both the uplink control (PUCCH or PRACH) and data transmission in the low power cell. TDD-ABS can provide reduction of power for additional sections or intervals in the downlink subframe of the macro node. In TDD-ABS, nodes in the HetNet may exchange a frame configuration pattern similar to TDM eICIC based on ABS, and assign ABS accordingly. In ABS, nodes may exchange the frame configuration pattern using an ABS status information element (IE) or an ABS information IE. The ABS information IE can provide information about which subframes the sending node (transmitting node or macro node) is configuring as almost blank subframes and which subset of almost blank subframes may be recommended for configuring measurements towards the mobile device. The ABS status IE can be used to aid the node designating ABS to evaluate a modification of the ABS pattern. In TDD-ABS, the mobile devices do not need to take the measurement of the LPN downlink transmission, as in ABS for symmetric TDD configuration, since the LPN is receiving (not transmitting) during an uplink transmission.

FIG. 3 illustrates mobile device to mobile device interference, where a nearby mobile device's uplink transmission 496 and 494 to a nearby node interferes with a receiving mobile device's reception of a serving node's downlink transmission 440 and 446. In an example, a desired uplink transmission 494 by the nearby mobile device 450 may generate a corresponding interference 496 to the receiving mobile device 460, as in subframe 4. In the example shown in FIG. 3, the serving node, such as the LPN 420, uses one extra downlink subframe compared to the nearby node, such as the macro node 410. The serving node uses configuration 4 (484) and nearby node uses configuration 3 (476). When the nearby mobile device and receiving mobile device are close together, the nearby mobile device can create interference for the receiving mobile device, which may be less severe compared to the node to node inference since mobile devices, such as the nearby mobile device, typically have much lower transmission power than nodes, such as the LPN. The mobile device to mobile device interference can still be problematic given that the power of the nearby mobile device transmission received by the receiving mobile device may be higher than the serving node transmission due to the relative distance of the nearby mobile device and serving node to the receiving mobile, even though the serving node has a greater transmission power than the nearby mobile device.

To mitigate the mobile device to mobile device interference, illustrated in both FIGS. 2 and 3, a measurement restriction method may be used by the receiving mobile device. Measurements may be reported by the mobile device in symmetric TDD for ABS and non-ABS. A new type of measurement and measurement report for mixed uplink and downlink TDD transmission may be used for mobile device to mobile device interference. The mixed uplink and downlink report can be used to help the serving node schedule subsequent subframe to the receiving mobile device, such as subframes with symmetric DL/UL configurations, to avoid the mobile device to mobile device interference. The receiving node may transmit the mixed uplink and downlink measurement report. Using the received mixed uplink and downlink measurement report, the serving node can determine the interference level from the nearby mobile device transmission due to the asynchronous DL/UL configuration, or the interference from a nearby non-serving node (or interference node) with an interfering downlink transmission.

The serving node or the receiving mobile device can use at least one measurement report trigger event. In LTE, a measurement report trigger event can include event A1-A5. Event A1 can occur when the serving node becomes better than a threshold. A threshold can be defined within a reportConfigEUTRA within IE ReportConfigEUTRA. The IE ReportConfigEUTRA can specify criteria for triggering of an evolved universal terrestrial radio access (E-UTRA) measurement reporting event. Event A2 can occur when the serving node becomes worse than the threshold. Event A3 can occur when the neighbor node, such as the nearby node, becomes an offset better than a primary cell (PCell), such as a macro cell. The offset may be defined within reportConfigEUTRA. Event A4 can occur when neighbor node, such as the nearby node, becomes better than threshold. Event A5 can occur when PCell becomes worse than a threshold1 and neighbor node becomes better than threshold2. A threshold1 and threshold2 can be defined within a reportConfigEUTRA. In another example, the serving node can use the combination of no A4 event triggered (i.e., no neighbor node is detected to be better than threshold), no A2 event based on RSRP triggered (i.e., serving node RSRP is still good enough), and/or A2 event based on RSRQ being triggered or a channel quality indicator (CQI) is very bad, to determine whether the interference level from the nearby mobile device transmission due to the asynchronous DL/UL configuration, or the interference from a nearby non-serving node (or interference node) with an interfering downlink transmission. A CQI can be a measure of channel quality derived from the reference signals.

In an LTE network, a UE can measure as least two parameters on a reference signal, including a reference signal received power (RSRP) and a reference signal received quality (RSRQ). RSRP can be defined as a linear average over the power contributions (in [W]) of the resource elements that carry cell-specific reference signals (CRS) within a considered measurement frequency bandwidth. For RSRP determination the CRS R0 may be used. If the mobile can reliably detect that R1 is available, R1 in addition to R0 may be used to determine RSRP. R0 and R1 are discussed in greater detail below with regard to CRS. The reference point for the RSRP may be an antenna connector of the mobile device. RSRQ can be defined as the ratio N×RSRP/(E-UTRA carrier RSSI), where N is the number of resource blocks (RBs) of the E-UTRA carrier received signal strength indicator (RSSI) measurement bandwidth. The measurements in the numerator and denominator can be made over the same set of resource blocks. The E-UTRA Carrier Received Signal Strength Indicator (RSSI) can comprise the linear average of the total received power (in [W]) observed in OFDM symbols containing reference symbols for an antenna port 0, in the measurement bandwidth, over N number of resource blocks by the UE from all sources, including co-channel serving and non-serving cells, adjacent channel interference, and/or thermal noise. The reference point for the RSRQ may be the antenna connector of the UE.

Figure 4:
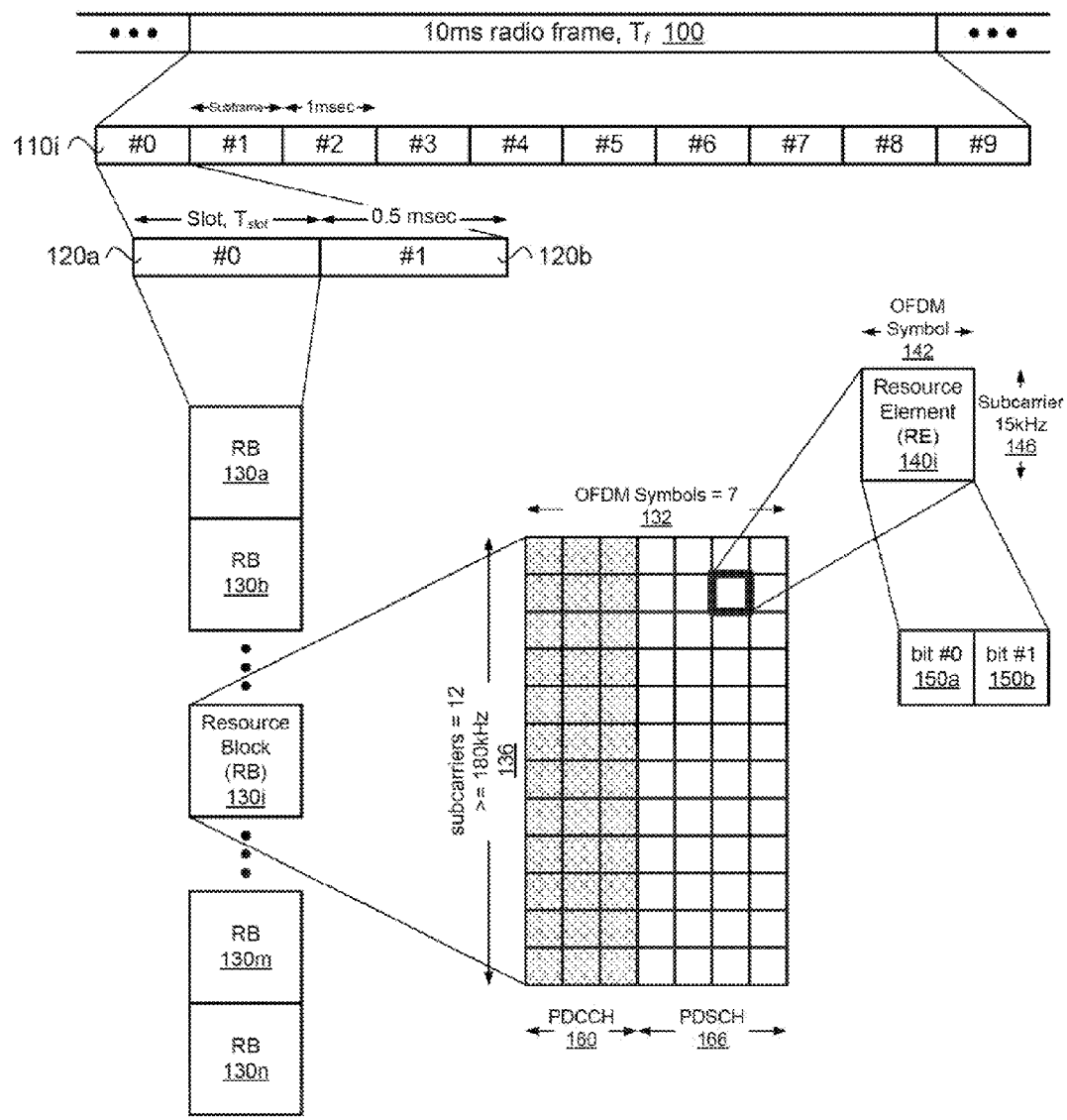
FIG. 4 illustrates a block diagram of radio frame resources in accordance with an example.

In one example, reference signals and data in wireless mobile communications can be transmitted on the physical (PHY) layer in a downlink transmission by a node or the transmission station (or eNodeB) to the mobile device (or UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using OFDM may also be used. An uplink transmission may have a similar frame structure to the downlink transmission used in to transmit the PUCCH and/or the PRACH from the mobile device to a node.

FIG. 4 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a physical downlink control channel (PDCCH) 160 and/or a physical downlink shared channel (PDSCH) 166, and the second slot (#1) 120$b$ can include data using the PDSCH. Each slot for a component carrier (CC) used by the transmitting station and the receiving station can include multiple resource blocks (RBs) 130$a$, 130$b$, 130$i$, 130$m$, and 130$n$ based on the CC frequency bandwidth. The CC can have a carrier frequency having a bandwidth and center frequency. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be known signals used for various reasons, such as to estimate a channel and/or noise in the channel. Reference signals can be received and transmitted by transmitting stations (or nodes) and mobile devices. Different types of reference signals (RS) can be used in an RB. For example, in LTE systems, downlink reference signal types can include a cell-specific reference signal (CRS), a multicast\broadcast single-frequency network (MBSFN) reference signal, a UE-specific reference signal (UE-specific RS or UE-RS) or a demodulation reference signal (DMRS), positioning reference signal (PRS), and a channel-state information reference signal (CSI-RS).

Figure 5A:
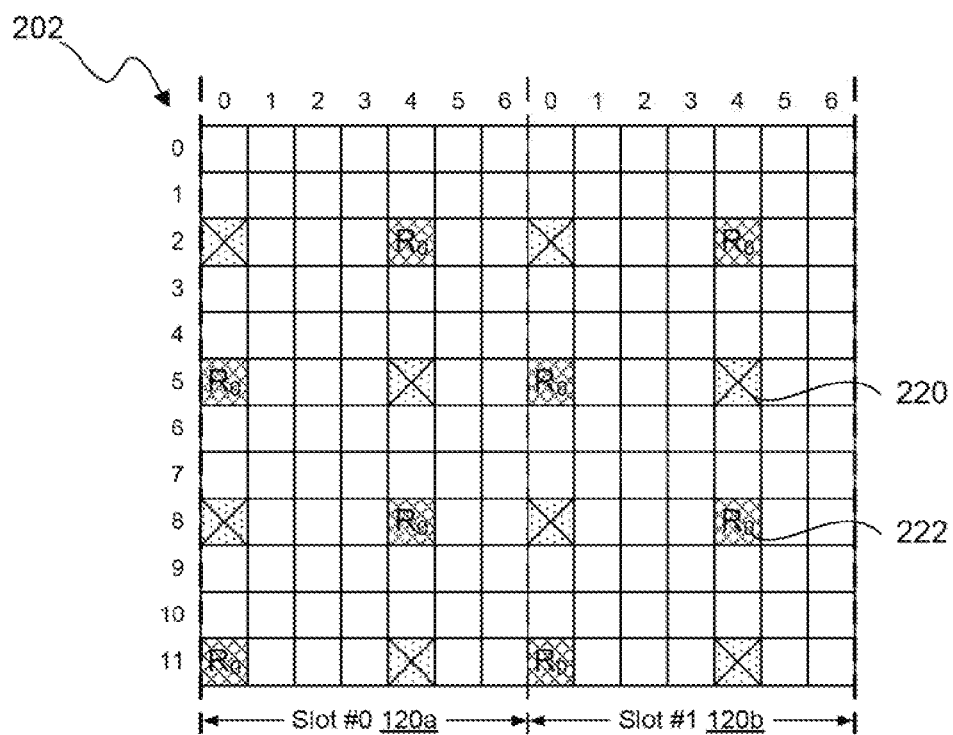
FIG. 5A illustrates a block diagram of cell-specific reference signals (CRS) in a resource block (RB) for antenna port 0 in a two antenna port wireless transceiver in accordance with an example.
Figure 5B:
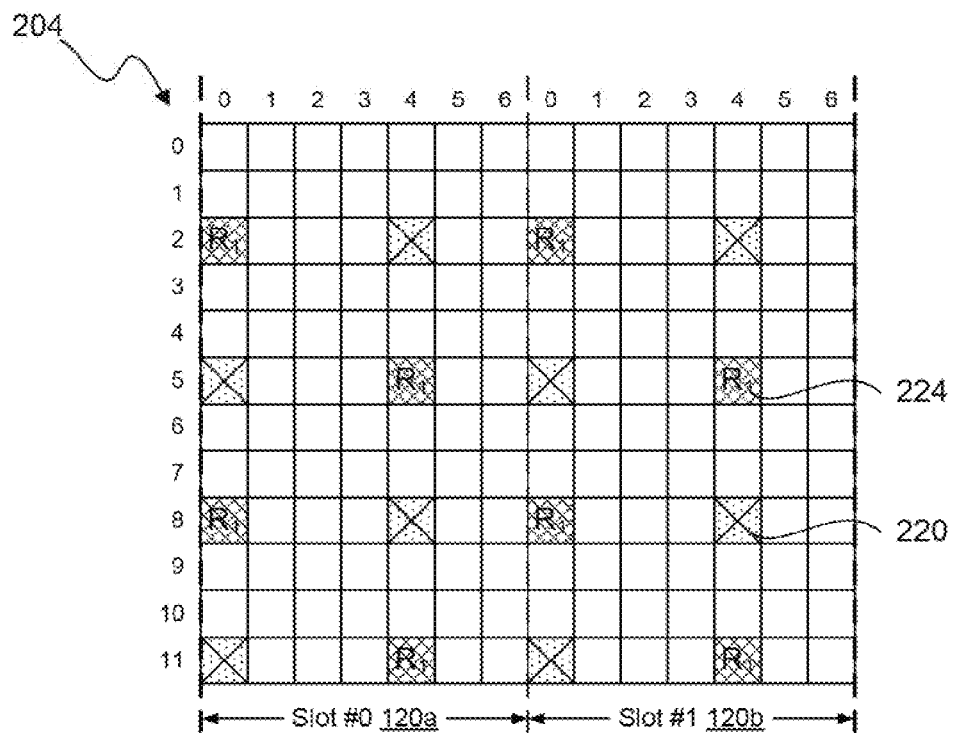
FIG. 5B illustrates a block diagram of cell-specific reference signals (CRS) in a resource block (RB) for antenna port 1 in a two antenna port wireless transceiver in accordance with an example.

FIG. 5A illustrates a RB 202 with CRS for antenna port 0 in a two antenna port wireless transceiver. As illustrated in FIG. 5A, the RB may include CRS REs 222 (cell-specific reference signal OFDM symbols or R0) used for transmitting CRSs for a specific antenna port (antenna port 0) and unused REs 220 (unused OFDM symbols) not used for transmission on the specific port, which allow other antenna ports to transmit their reference signals. FIG. 5B illustrates the CRS REs 224 (R1) in a RB 204 used for transmitting CRSs for antenna port 1, which can be located in the REs with the same frequency-domain index and time-domain index as unused REs for antenna port 0. So, the CRSs of antenna port 0 are transmitted on the REs with the same frequency-domain index and time-domain index as unused REs for antenna port 1, and the CRSs of antenna port 1 are transmitted on the REs with the same frequency-domain index and time-domain index as unused REs for antenna port 0. The number of reference signal REs and unused REs used in the RB can depend on the number of antenna ports and type of reference signal being transmitted.

For an uplink subframe, the PUCCH may be transmitted in a first RB of the subframe. The PUCCH can carry control information. The uplink control information may comprise downlink acknowledgements as well as CQI related reports, as all the uplink coding and allocation parameters can be known by the node and signaled to the mobile device in a physical downlink control channel (PDCCH). The PUCCH may transmit an acknowledge character (ACK) or negative-acknowledge character (NACK), a CQI, scheduling requests (SR), or sounding reference signals (SRS).

PRACH can be used for initial access and uplink resynchronization when the mobile device losses its uplink synchronization. PRACH can be used to transmit a random access channel (RACH) preamble. PRACH resources can be assigned by the eNodeB within physical uplink shared channel (PUSCH) region. The PUSCH can be used for uplink data transmission. The PRACH preamble may fit into 6 PRBs. The PRACH may be sufficient for timing estimation, invariant with bandwidth for low complexity, and use a Zadoff Chu sequence. Multiple PRACH formats may be suitable for different cell sizes.

The asymmetric TDD configuration, including a mixed uplink and downlink configuration, can be useful for certain deployment cases, such a home eNodeB (HeNB) network in a HetNet. The HBS by the macro node or the measurement of an uplink interference at the mobile device can provide eICIC for the mixed uplink and downlink configuration.

Another example provides a method 500 to support an asymmetric time-division duplex (TDD) configuration at a macro node in a heterogeneous network (HetNet), as shown in the flow chart in FIG. 6. The method includes the operation of transmitting a half blank subframe (HBS) of a downlink subframe by a macro node in the HetNet during an uplink subframe of a low power node in the HetNet, wherein an effective transmission range of the macro node overlaps with an effective transmission range of the low power node, and the downlink subframe and the uplink subframe occur on a substantially same carrier frequency; and wherein the HBS has a reduced transmission power during an uplink control channel or a random access channel of the uplink subframe of a mobile device transmission to the low power node, as in block 510.

The uplink control channel can include a physical uplink control channel (PUCCH). The random access channel can include a physical random access channel (PRACH). A backoff value may be used to reduce the transmission power of the HBS so the HBS does not create interference during the uplink control channel or the random access channel of the uplink subframe. The macro node can reduce transmission power of the HBS by at least a factor of ten or any other factor using a transmission power backoff value. The macro node can reduce transmission power of the HBS to an approximately zero transmission power or generate no transmission power during the uplink control channel or the random access channel of the uplink subframe of a HBS. The macro node can receive measured interference information from the low power node via X2 signaling, and reduce the transmission power based on the received measured interference information prior to transmitting the HBS. The macro node and the low power node can communicate using X2 signaling or backhaul link signaling via a wired connection or an optical fiber connection. The macro node can receive configuration information about the uplink control channel or the random access channel prior to transmitting the HBS. The received configuration information for a low power node radio frame can differ from configuration information for a macro node radio frame. For example, as shown in FIG. 2, the macro node may use a radio frame configuration 4 (474) with a downlink allocation in subframe 4 and the low power node may use a radio frame configuration 3 (482) with an uplink allocation in subframe 4.

In another example, a majority of an effective area of a low power cell serviced by the low power node is within an effective area of a macro cell serviced by the macro node. The macro node can include a macro evolved Node B (macro-eNB) and the low power node can include a micro-eNB, a pico-eNB, a femto-eNB, or a home eNB (HeNB). The macro node can transmit downlink subframes to and receives uplink subframes from mobile devices within the macro cell. The low power node can transmit downlink subframes to and receives uplink subframes from mobile devices within a microcell, a picocell, or a femtocell. In another example, the HBS can reduce transmission power during a data section of the uplink subframe of the mobile device transmission to the low power node.

Figure 7:
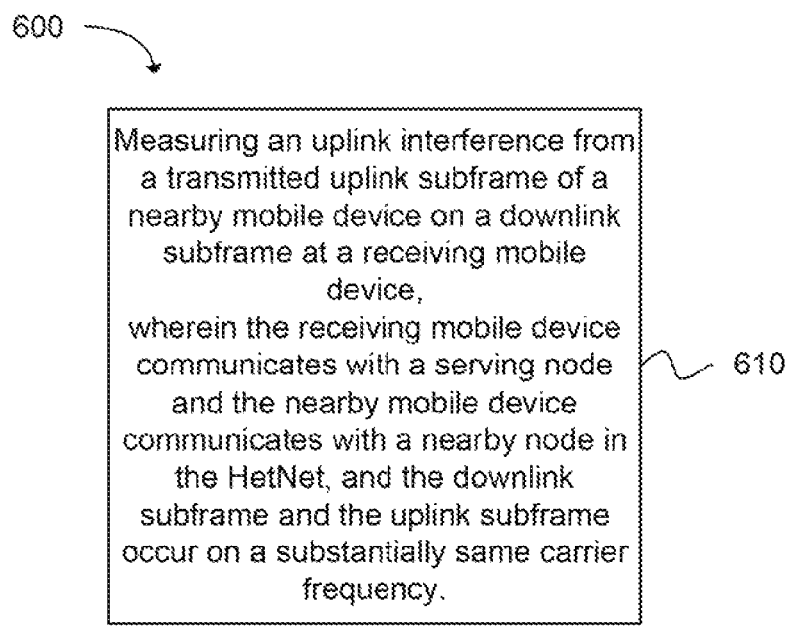
FIG. 7 depicts a flow chart of a method to support an asymmetric time-division duplex (TDD) configuration at a mobile device in a heterogeneous network (HetNet) in accordance with an example.

Another example provides a method 600 to support an asymmetric time-division duplex (TDD) configuration at a mobile device in a heterogeneous network (HetNet), as shown in the flow chart in FIG. 7. The method includes the operation of measuring an uplink interference from a transmitted uplink subframe of a nearby mobile device on a downlink subframe at a receiving mobile device, wherein the receiving mobile device communicates with a serving node and the nearby mobile device communicates with a nearby node in the HetNet, and the downlink subframe and the uplink subframe occur on a substantially same carrier frequency, as in block 610.

In another example, the serving node can include a low power node and the nearby node includes a macro node. A majority of an effective area of a microcell serviced by the low power node can be within an effective area of a macrocell serviced by the macro node. The nearby mobile device and receiving mobile device can each include a UE. The uplink interference can be determined by interference measurements, such as a RSRP, a RSRQ, a RSSI, a CQI or a CQI report, or combinations of these interference measurements. The receiving mobile device can generate a mixed uplink-downlink measurement report from the measurement of the uplink interference on the downlink subframe. The receiving mobile device can send the mixed uplink-downlink measurement report to the serving node. The receiving mobile device can receive control information from the serving node rescheduling subsequent downlink subframes on another carrier frequency. The receiving mobile device can send the mixed uplink-downlink measurement report to the serving node when the uplink interference exceeds a predetermined interference level. The predetermined interference level can be determined by a measurement report trigger event, such as A1-A5. In another example, the receiving mobile device can measure a downlink interference on the downlink subframe from an interference node in the HetNet.

Figure 8:
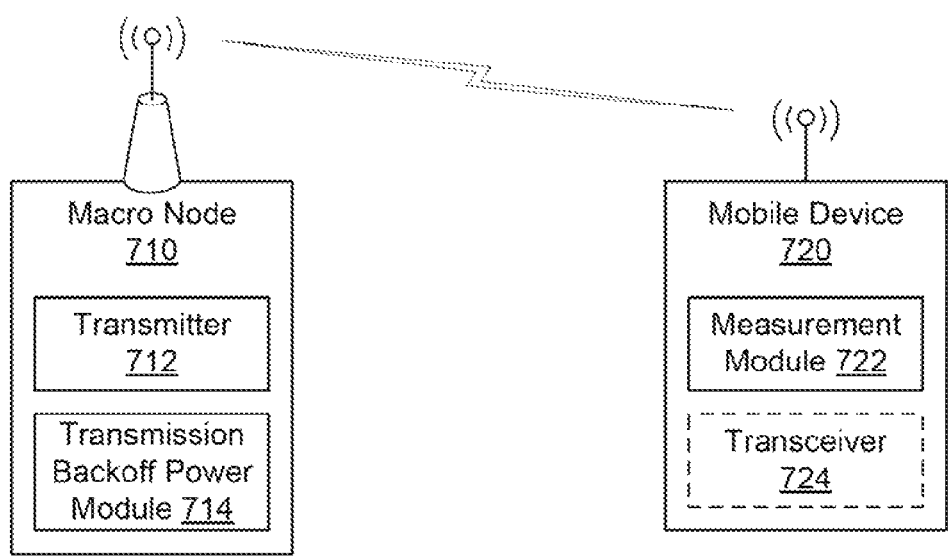
FIG. 8 illustrates a block diagram of a macro node and a mobile device in accordance with an example.

FIG. 8 illustrates an example node and an example mobile device 720 in a HetNet. The node can include a macro node 710 (or macro-eNB) or a low power node (micro-eNB, a pico-eNB, a femto-eNB, or a HeNB). The node can include a transmitter 712 and a transmission backoff power module 714. The transmitter of the node can be configured to transmit a HBS of a downlink subframe during an uplink subframe of a low power node in the HetNet. The transmission backoff power module of the transmission station can be configured to reduce transmission power of the transmitter for the HBS during an uplink control channel or a random access channel of the uplink subframe of a mobile device transmission to the low power node. An effective transmission range of the macro node can overlap with an effective transmission range of the low power node. The downlink subframe and the uplink subframe can occur on a substantially same carrier frequency. The mobile device (or UE) can be in communication with a macro node (or macro eNodeB) or a low power node (or micro eNodeB, pico eNodeB, femto eNodeB, or HeNB). In an example, an available transmission power of the macro node may be at least ten times an available transmission power of the low power node.

The mobile device 720 can include a measurement module 722 and a transceiver 724. The measurement module of the mobile device can be configured to measure an uplink interference from a transmitted uplink subframe of a nearby mobile device on a downlink subframe. The mobile device can communicate with a serving node and the nearby mobile device can communicate with a nearby node in the HetNet. The downlink subframe and the uplink subframe can occur on a substantially same carrier frequency. The measurement module can be further configured to generate a mixed uplink-downlink measurement report from the measurement of the uplink interference on the downlink subframe. The uplink interference can be determined by an interference measurement, which can be determined from a RSRP, a RSRQ, a RSSI, or a CQI or a CQI report. The transceiver of the mobile device can be further configured to send the mixed uplink-downlink measurement report to the serving node, and receiving control information from the serving node rescheduling subsequent downlink subframes on another carrier frequency. The measurement module can be further configured to trigger the transceiver to send the mixed uplink-downlink measurement report when the uplink interference exceeds a predetermined interference level. The predetermined interference level can determined by at least one measurement report trigger event. In another example, the measurement module can be configured to measure a downlink interference on the downlink subframe from an interference node.

Figure 9:
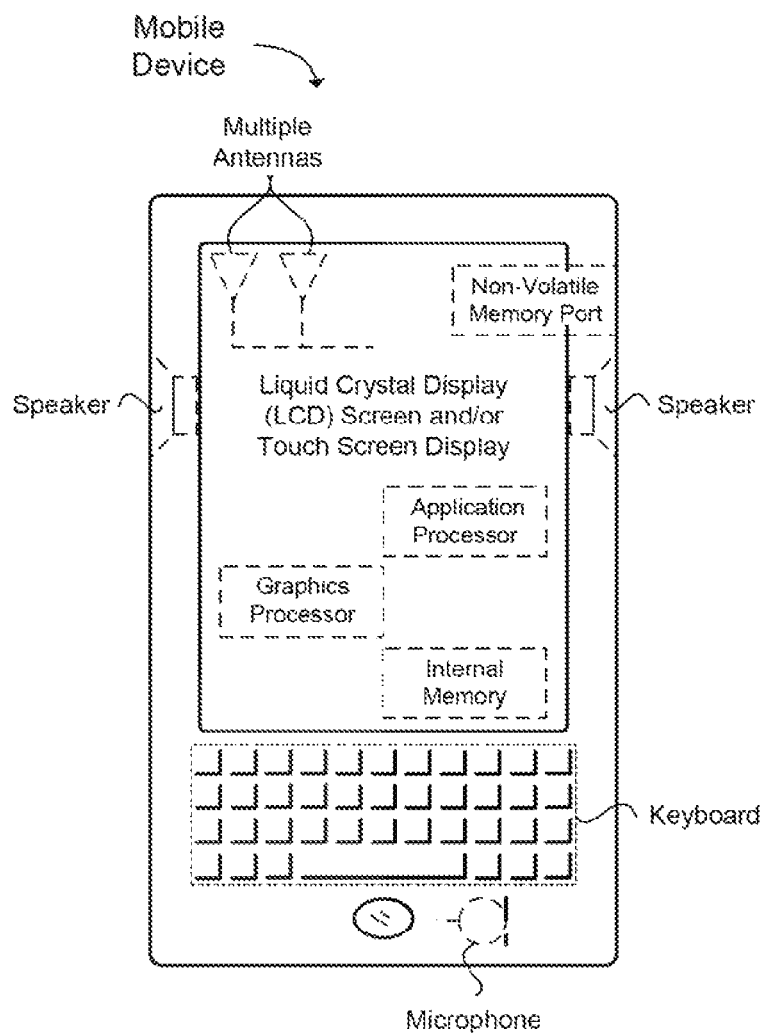
FIG. 9 illustrates a diagram of a mobile device in accordance with an example.

In another example, a transmission station can be in wireless communication with a mobile device. FIG. 9 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product, comprising a non-transitory computer readable storage medium having a computer readable program code embodied therein, the computer readable program code adapted to be executed to implement a method, the method comprising:

transmitting a half blank subframe (HBS) of a downlink subframe by a macro node in a heterogeneous network (HetNet) using an asymmetric time-division duplex (TDD) configuration at the macro node in the HetNet during a same time period of an uplink subframe of a low power node in the HetNet, wherein an effective transmission range of the macro node overlaps with an effective transmission range of the low power node, and the downlink subframe and the uplink subframe occur on a substantially same carrier frequency to reduce interference at the low power node caused by the macro node; and wherein the HBS has a reduced transmission power during an uplink control channel or a random access channel of the uplink subframe of a mobile device transmission to the low power node.

2. The computer program product of claim 1, wherein the HBS includes reduced transmission power during a data section of the uplink subframe of the mobile device transmission to the low power node.

3. The computer program product of claim 1, wherein the reduced transmission power of the HBS transmitted by the macro node is reduced by at least a factor of ten using a transmission power backoff value.

4. The computer program product of claim 1, wherein the reduced transmission power of the HBS transmitted by the macro node has an approximately zero transmission power.

5. The computer program product of claim 1, further comprising:

receiving measured interference information from the low power node by the macro node via X2 signaling; and reducing the transmission power based on the received measured interference information prior to transmitting the HBS.

6. The computer program product of claim 1, further comprising receiving configuration information at the macro node about the uplink control channel or the random access channel, wherein the configuration information is transmitted from the low power node via X2 signaling prior to transmitting the HBS.

7. The computer program product of claim 6, wherein the received configuration information for a low power node radio frame differs from configuration information for a macro node radio frame.

8. The computer program product of claim 1, wherein the uplink control channel includes a physical uplink control channel (PUCCH), and the random access channel includes a physical random access channel (PRACH).

9. The computer program product of claim 1, wherein a majority of an effective area of a low power cell serviced by the low power node is within an effective area of a macro cell serviced by the macro node.

10. The computer program product of claim 1, wherein the macro node includes a macro evolved Node B (macro-eNB) and the low power node includes a micro-eNB, a pico-eNB, a femto-eNB, or a home eNB (HeNB).

11. The method computer program product of claim 1, wherein the macro node transmits downlink subframes to and receives uplink subframes from mobile devices within a macrocell, and the low power node transmits downlink subframes to and receives uplink subframes from mobile devices within a microcell, a picocell, or a femtocell.

12. A macro node in a heterogeneous network (HetNet), comprising:

a transmitter configured to transmit a half blank subframe (FIBS) of a downlink subframe using an asymmetric time-division duplex (TDD) configuration at the macro node in the HetNet during a same time period of an uplink subframe of a low power node in the HetNet; and a transmission backoff power module configured to reduce transmission power of the transmitter for the FIBS during an uplink control channel or a random access channel of the uplink subframe of a mobile device transmission to the low power node, wherein an effective transmission range of the macro node overlaps with the an effective transmission range of the low power node, and the downlink subframe and the uplink subframe occur on a substantially same carrier frequency to reduce interference at the low power node caused by the macro node.

13. The macro node of claim 12, wherein the FIBS includes reduced transmission power during a data section of the uplink subframe of the mobile device transmission to the low power node.

14. The macro node of claim 12, further comprising a transceiver configured to receive configuration information about the uplink control channel or the random access channel from the low power node via X2 signaling.

15. The macro node of claim 12, wherein the macro node includes a macro evolved Node B (macro-eNB) and the low power node includes a micro-eNB, a pico-eNB, a femto-eNB, or a home eNB (HeNB).

16. A computer program product, comprising a non-transitory computer readable storage medium having a computer readable program code embodied therein, the computer readable program code adapted to be executed to implement a method, comprising:

measuring an uplink interference from a transmitted uplink subframe of a nearby mobile device on a downlink subframe at a receiving mobile device using an asymmetric time-division duplex (TDD) configuration at the receiving mobile device in a heterogeneous network (HetNet); and generating a mixed uplink-downlink measurement report from the measurement of the uplink interference on the downlink subframe by the receiving mobile device, wherein the receiving mobile device communicates with a serving node and the nearby mobile device communicates with a nearby node in the HetNet, and the downlink subframe and the uplink subframe occur on a substantially same carrier frequency and occur during a same time period for the asymmetric TDD configuration between the receiving node and the nearby mobile device.

17. The computer program product of claim 16, wherein the serving node includes a low power node and the nearby node includes a macro node, and a majority of an effective area of a microcell serviced by the low power node is within an effective area of a macrocell serviced by the macro node.

18. The computer program product of claim 17, wherein the nearby mobile device and receiving mobile device each include a user equipment (UE), the macro node includes a macro evolved Node B (macro-eNB), and the low power node includes a micro-eNB, a pico-eNB, a femto-eNB, or a home eNB (HeNB).

19. The computer program product of claim 16, wherein the uplink interference is determined by interference measurement selected from the group consisting of a reference signal received power (RSRP), a reference signal received quality (RSRQ), a received signal strength indicator (RSSI), a channel quality indicator (CQI), and combinations thereof.

20. The computer program product of claim 16, further comprising measuring a downlink interference on the downlink subframe from an interference node in the HetNet by the receiving mobile device.

21. The computer program product of claim 20, further comprising:

sending the mixed uplink-downlink measurement report from the receiving mobile device to the serving node; and receiving control information from the serving node to the receiving mobile device rescheduling subsequent downlink subframes on another carrier frequency.

22. The computer program product of claim 16, further comprising sending the mixed uplink-downlink measurement report from the receiving mobile device to the serving node when the uplink interference exceeds a predetermined interference level, wherein the predetermined interference level is determined by at least one measurement report trigger event.

23. A mobile device in a heterogeneous network (HetNet), comprising:

a measurement module configured to measure an uplink interference from a transmitted uplink subframe of a nearby mobile device on a downlink subframe using an asymmetric time-division duplex (TDD) configuration at a service node in a heterogeneous network (HetNet); and generate a mixed uplink-downlink measurement report from the measurement of the uplink interference on the downlink subframe, wherein the mobile device communicates with the serving node and the nearby mobile device communicates with a nearby node in the HetNet, and the downlink subframe and the uplink subframe occur on a substantially same carrier frequency and occur during a same time period for the asymmetric TDD configuration between the service node and the mobile device.

24. The mobile device of claim 23, wherein the measurement module is further configured to measure a downlink interference on the downlink subframe from an interference node.

25. The mobile device of claim 23, wherein the uplink interference is determined by interference measurement selected from the group consisting of reference signal received power (RSRP), reference signal received quality (RSRQ), received signal strength indicator (RSSI), channel quality indicator (CQI), and combinations thereof.

26. The mobile device of claim 25, further comprising:

a transceiver configured to send the mixed uplink-downlink measurement report to the serving node, and receiving control information from the serving node rescheduling subsequent downlink subframes based on the mixed uplink-downlink measurement report.

27. The mobile device of claim 26, wherein the measurement module is further configured to trigger the transceiver to send the mixed uplink-downlink measurement report when the uplink interference exceeds a predetermined interference level, wherein the predetermined interference level is determined by at least one measurement report trigger event.

28. The mobile device of claim 23, wherein the mobile device and the nearby mobile device each include a user equipment (UE), and the mobile device includes an antenna, a touch sensitive display screen, a speaker, a microphone, a graphics processor, an application processor, internal memory, a non-volatile memory port, or combinations thereof.

* * * * *